May 31, 1932. H. W. NORGAARD 1,860,720
APPARATUS FOR FILLING CONTAINERS WITH FRUIT AND VEGETABLES
Filed Sept. 30, 1929  4 Sheets-Sheet 1

Fig.1

Inventor
Hal W. Norgaard
By Lyon & Lyon
Attorneys

May 31, 1932.  H. W. NORGAARD  1,860,720
APPARATUS FOR FILLING CONTAINERS WITH FRUIT AND VEGETABLES
Filed Sept. 30, 1929  4 Sheets-Sheet 2

Inventor
Hal W. Norgaard
By Lyon & Lyon
Attorneys

May 31, 1932.  H. W. NORGAARD  1,860,720
APPARATUS FOR FILLING CONTAINERS WITH FRUIT AND VEGETABLES
Filed Sept. 30, 1929  4 Sheets-Sheet 3

Inventor
Hal W. Norgaard
By Lyon & Lyon
Attorneys

May 31, 1932.   H. W. NORGAARD   1,860,720
APPARATUS FOR FILLING CONTAINERS WITH FRUIT AND VEGETABLES
Filed Sept. 30, 1929   4 Sheets-Sheet 4

Inventor
Hal W. Norgaard
By Lyon & Lyon
Attorneys

Patented May 31, 1932

1,860,720

UNITED STATES PATENT OFFICE

HAL W. NORGAARD, OF OAKLAND, CALIFORNIA, ASSIGNOR TO CALIFORNIA PACKING CORPORATION, OF SAN FRANCISCO, CALIFORNIA, A CORPORATION OF NEW YORK

APPARATUS FOR FILLING CONTAINERS WITH FRUIT AND VEGETABLES

Application filed September 30, 1929. Serial No. 396,113.

This invention relates to a new and novel apparatus for filling containers such as cans, with fruits or vegetables. The apparatus is characterized by its simplicity and accuracy of operation. It is particularly adapted for the filling of cans with sliced fruits and vegetables continuously and permits cans or other containers to be uniformly filled to their maximum capacity in a ready and efficient manner without injuring the tissues of the fruits and vegetables.

In canning fruits and vegetables it is desirable that the fruits or vegetables do not come in contact with any unsterilized materials, and that they be not handled. It is also desirable that the cans or other containers be filled to maximum capacity uniformly, and that the fruit be compressed to a certain extent within the container so as to make certain that the cover or cap can be placed properly thereon.

An object of this invention is to disclose and provide a machine adapted to automatically fill cans with fruits and vegetables.

Another object is to disclose and provide a device capable of filling containers with fruits and vegetables and compressing the fruits or vegetables within the container.

Another object is to disclose and provide a device adapted to fill containers with fruits and vegetables, remove any excess from the top of the containers, and compress the fruit within the container, these operations being carried out in a continuous and effective manner.

A still further object is to disclose and provide a method whereby cans may be filled in a continuous manner.

In describing the invention, reference will be had to the appended drawings, which illustrate one form of machine embracing the invention. It is to be understood that numerous changes and modifications may be made and that the invention is not limited to the particular construction shown therein.

Figure 1:
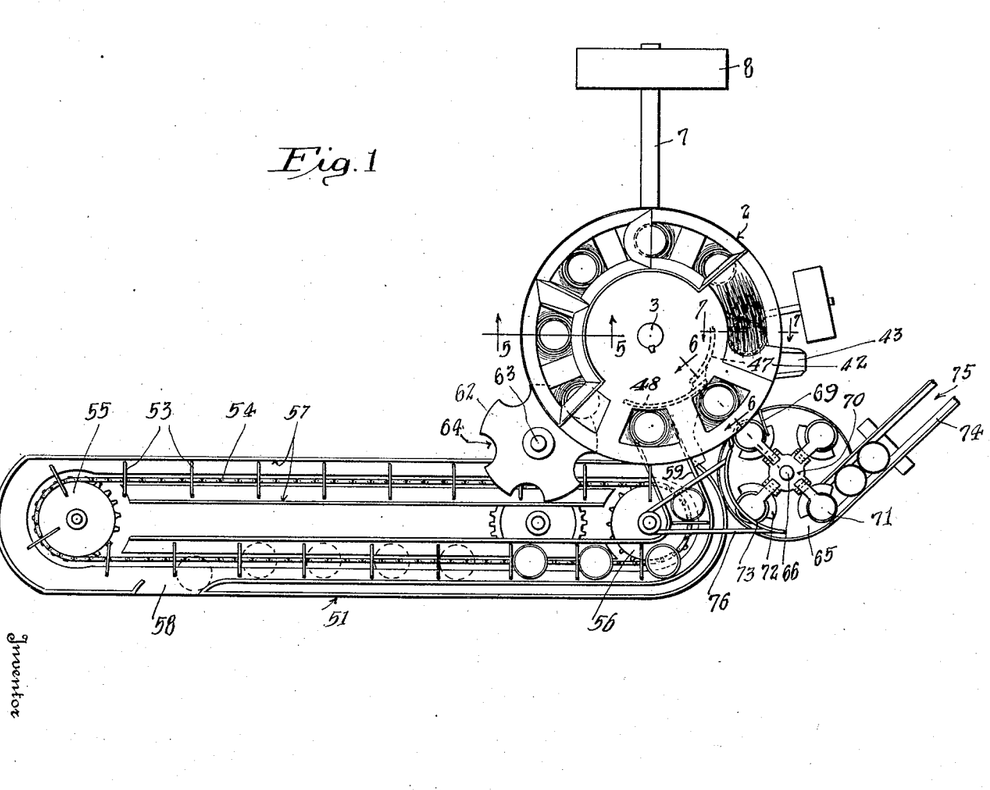
Fig. 1 is a plan view of the entire apparatus.
Figure 3:
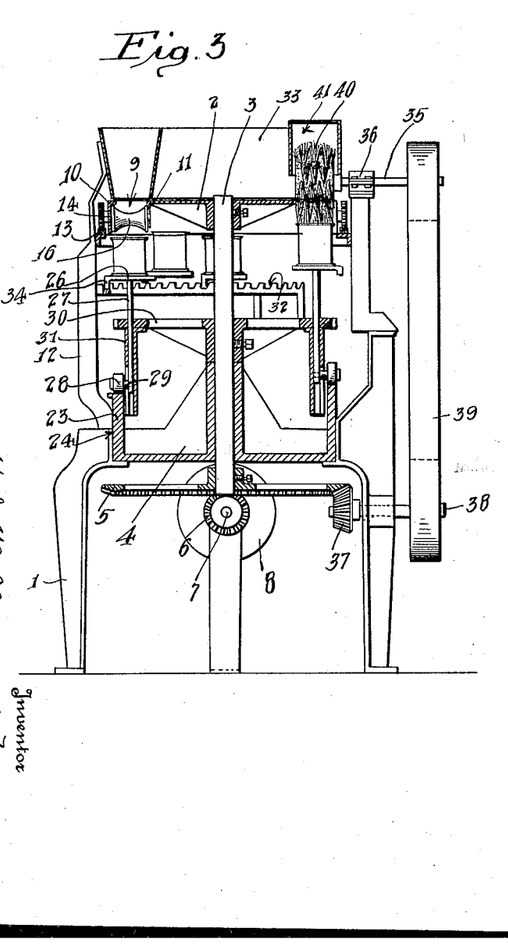
Fig. 3 is a vertical axial section through the filling mechanism proper.

Referring to Fig. 1, the apparatus preferably comprises three major portions, namely, a conveyor for feeding empty cans to the filling machine, a filling machine, and a discharge table. The filling machine preferably comprises a base 1 provided with a rotatably mounted head 2. As shown in Fig. 3 the head 2 may be mounted upon a vertical shaft 3, journaled in suitable bearings formed in a cross member 4 forming a part of the base 1.

A gear 5 is preferably mounted on the lower end of the shaft 3, power being imparted thereto by means of a miter gear 6 mounted on a shaft 7 to which power may be supplied from a suitable source, as for example, by means of a belt from a suitable prime mover passing over the pulley 8 mounted on the shaft 7.

The rotating head 2 is preferably provided with a plurality of spaced apertures 9 in its periphery. Furthermore, the head 2 may be provided with a downwardly extending flange 10 at its outer edge and a similar annular flange 11, the openings 9 communicating with the space between the flanges 10 and 11, as more clearly indicated in Figs. 5, 6 and 7.

Extending from the base 1 may be a plurality of stationary arms or supports 12, said arms supporting a circular rack or ring gear 13. Extending between the flanges 10 and 11 are shafts 14 and 15 having concave rollers 16 and 17, respectively, mounted thereon. A pair of these rollers 16 and 17 are positioned beneath each of the openings 9 in the rotating head 2. The rollers 16 and 17 are rotated in pairs toward each other by means of a suitable train of gears, such as for example, a gear 18 mounted upon a suitable pin 19 attached to the outer flange 10, said gear 18 being in operative contact with the ring gear 13.

Figure 4:
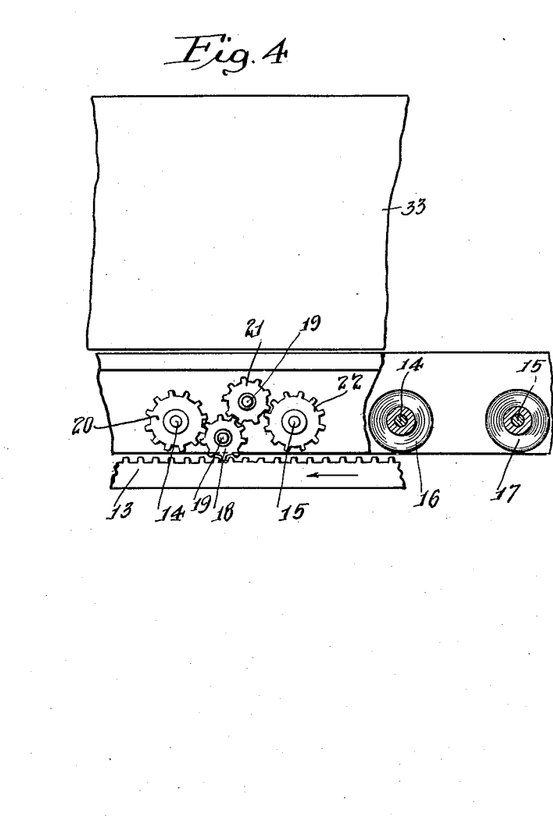
Fig. 4 is an enlarged side elevation, partly broken away and extended so as to illustrate the construction and means employed in driving the feed rollers.

The gear 18 preferably meshes with a gear 20 mounted upon shaft 14 and also with an idler gear 21 which is in operative contact with a gear 22 mounted upon the shaft 15. Rotation of the filling head 2, therefore, causes the gear 18 to revolve (inasmuch as the ring gear 13 is stationary), thereby imparting rotation to gears 20, 21 and 22 in the direction of the arrows indicated in Fig. 4. The rollers 16 and 17, therefore, revolve toward each other, acting as feeding rollers through which material fed through the opening 9 above said pair of rollers is forced into a can or other receptacle or container positioned below said rollers.

The base 1 of the device includes a circular cam 23 provided with a riser or high portion 24 at a point adjoining that portion of the machine at which the empty cans or containers are admitted. The cam 23 also includes a depressed portion 25. Can receiving members 26 preferably comprising discs mounted upon rods 27 are supported by the cam 23 by means of rollers 28 pivotally connected to the rods 27 as by means of the pins 29.

The can receiving members 26 and their supporting rods 27 are maintained in spaced relation to each other and in substantial alinement with the apertures 9 in the rotating head 2 by means of a spider 30 mounted upon the vertical drive shaft 3, said spider slidably receiving the rods or arms 27 of the can receiving member 26. The ends of the spider 30 are preferably provided with guides 31 adapted to maintain the rod 27 in a vertical position. It will thus be seen that rotation of shaft 3 will impart rotation to the spider 30, thereby causing the rods 27 supporting the can receiving members 26 to rotate the can receiving member 26, the rods 27 being supported by means of rollers 28 upon the edges of the cam 23 so that during rotation of said can receiving members they will move in a vertical plane, depending upon the riser 24 and the depression 25 in the cam 23.

The pins 29 on which the rollers 28 are journaled extend through vertical slots formed in the guides 31 so that rotation of shaft 27 and of the can receiving members 26 is prevented during their travel around the shaft 3.

The members 12 also preferably support a serrated rack 32, said rack extending for only a portion of the distance around the shaft 3 and preferably from a point just in advance of the feed hopper 33 supported above the rotating head 2, to a point substantially diametrically opposed thereto. The can receiving members 26 are each preferably provided with a depending lug 34, said lug 34 being adapted to contact with the rack 32, thereby causing the can receiving member 26 to reciprocate repeatedly in a vertical plane during a portion of its travel. This repeated reciprocation in the vertical plane vibrates or jigs the can receiving member 26 for a purpose to be described later.

Near the discharge end of the filling machine means are provided for removing excess material, such as for example, fruits or vegetables which have been placed in the cans or containers 34$^a$ and carried by the can receiving members 26. Said means may include a shaft 35 mounted above the rotating head 2 and substantially at right angles to the shaft 3, said shaft 35 being supported in a suitable bearing 36.

The shaft 35 may be driven in any suitable manner, as for example, by means of a miter gear 37 mounted upon a shaft 38, said miter gear 37 being in operative contact with the gear 5 mounted on shaft 3. Rotation of shaft 38 may be imparted to shaft 35 by means of a belt 39 and suitable pulleys mounted on said shafts 38 and 35, respectively.

The shaft 35 is preferably provided with a rotating brush 40 provided with flexible fingers, said fingers being preferably made of rubber or other easily cleaned and sterilized material having some flexibility. The fingers of the brush 40 are of sufficient length so as to contact with the top of the filled can 34, any excess fruit or vegetables piled up in the can 34 being whipped up into a compartment 41 in communication with the feeding hopper 33. Fruit adhering to the fingers of the brush 40 is removed therefrom by striking a scraper 42, said scraper being inclined and leading to a chute 43. Thus, injured fruit or fruit which has been injured by the action of the brush 40 is separately discharged through the chute 43, whereas fruit which may be readily lifted from the top of can 34 is thrown back into compartment 41 which leads to the feed hopper 33 for refeeding into a subsequent can.

Figure 5:
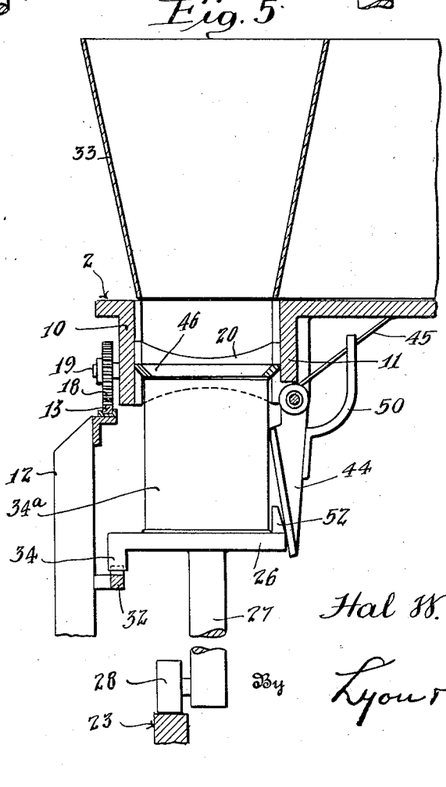
Fig. 5 is a vertical enlarged section taken through a portion of the filling machine, said section being taken along plane 5—5 indicated in Fig. 1.
Figure 6:
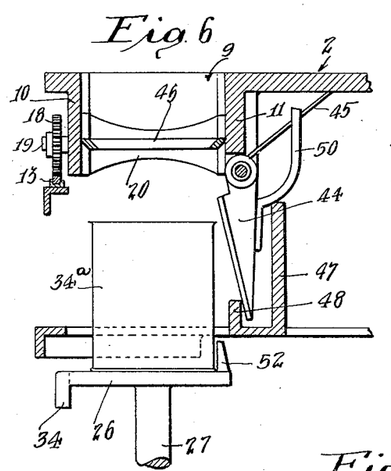
Fig. 6 is an enlarged vertical section taken along line 6—6 of Fig. 1.
Figure 7:
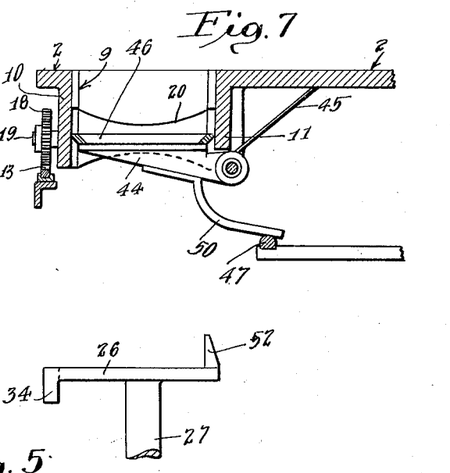
Fig. 7 is an enlarged vertical section taken along line 7—7 of Fig. 1, showing the gate in closed position.

The rotating head 2 is provided with a plurality of gates adapted to close the apertures 9 if a can or other container 34$^a$ is not properly fed thereto. Preferably, the gate is pivotally connected to the lower edge of flange 11, as shown in Figs. 5, 6 and 7. The gate 44 is preferably actuated by means of a spring 45 adapted to place said gate 44 in closed position, indicated in Fig. 7, said gate coming into contact with a gasket 46 positioned in the aperture 9, said gasket 46 being adjustable in internal diameter (by the substitution of suitable gaskets) to the diameter of the can being filled.

Means are also provided for opening said gates 44, said means including a cam or cams 47 and 48. The position of these cams is indicated in Fig. 1. The cams 47 and 48 are stationary and are attached to the base 1 in any suitable manner. The operation of these cams is as follows: If we assume that a can is not upon the can receiving member 26, then when the head 2 reaches a position indicated at A, Fig. 1, the lever 50 of the gate 44 will contact with the cam 47. Cam 47 is curved upwardly so that as the rotation of the head 2 continues, the lever 50 will be raised upwardly, thereby opening the gate 44. After the gate 44 assumes a position such as is shown in Fig. 6, that is, at maximum opening, the cam 48 will pass in front of the outer edge of gate 44 holding said gate 44 in open position. After the edge of the gate 44 is held by the cam 48, the cam 47 is discontinued or terminates. The cam 48 continues to hold the gate open for a sufficient length of time to permit a can from the feeding conveyor 51 to be admitted onto the can receiving member 26. The can receiving member 26 is still in lowered position, that is, the roller 28 is riding along the depression 25 of the cam 23. The cam 48 terminates at a point beyond the empty can inlet, thereby releasing the gate 44. If no can or container 34$^a$ is present on the can receiving member 26, then the gate 44 thus released will swing upwardly against the gasket 46 and close the aperture 9. If, however, a can or other container 34$^a$ is in position on the can receiving member 26, then the gate 44 will rest thereagainst and as the can receiving member rises, due to the action of cam 23, then a pin 52 will move the gate 44 away from the can 34$^a$, as indicated in Fig. 5.

The pin 52 is attached to the rear edge of the can receiving member 26.

It is to be understood that the curved arm 50 attached to the gate 44 more or less counterbalances the weight of the gate, and the spring 45 is only sufficiently strong to close the gate 44, and is insufficient to force the gate 44 to close when a can or other container 34 is in position on the can receiving member 26.

Any suitable means for admitting or feeding empty cans to the filling machine may be employed, although as shown in Fig. 1, a conveyor 51 may be used. Said conveyor 51 may comprise a plurality of lugs or partitions 53 attached to a chain or other continuous member 54 passing around sprockets or pulleys 55 and 56. The vertical partitions, lugs or plates 53 may travel between walls 57.

An inlet 58 for empty cans may be provided, and a guide 59 permits the cans to be fed onto the can receiving members 26 of the filling machine proper. The conveyor 51 is preferably driven by a gear 60 which is in operative contact with a large spur gear 61 mounted on the shaft 3. The gear 61 may be, as a matter of fact, carried by the spider 30. In this manner the conveyor 51 is driven in timed relation with the filling head 2, so that an empty can is fed to each can receiving member 26 as it comes in position opposite the inlet guide 59.

A star wheel 62 may be provided, said star wheel being mounted upon a shaft 63 driven by suitable gearing from the shaft 3. The star wheel 62 may be provided with a plurality of spaced semi-circular depressions or sockets 64 adapted to receive the cans 34 while they are on the can receiving member 26, and to center them so that the rising of the can receiving member 26 will force said cans into contact with the gasket 46 within the aperture 9 formed in the rotating head 2.

Positioned in operative relation with the filling machine proper may be a compressing device. Said device may comprise a rotating table 65 mounted upon a suitable shaft 66, said shaft being driven by means of a gear 67 from the spur gear 61 or in any other suitable manner. The shaft 66 may be supported in a suitable bearing as by means of the support 68 attached to the base 1 of the filling machine. Guides 69 direct cans which have been filled, vibrated and had the excess material removed therefrom, from the rotating filling machine onto the rotating discharge table 65.

The upper end of shaft 66 may carry a spider 70 provided with a plurality of spring actuated presser members 71 pivotally connected to the spider 70. The discharge table 65 may also be provided with a plurality of sockets or guides 72 adapted to receive the filled cans from the filling table, and to center them under the presser members 71.

Figure 2:
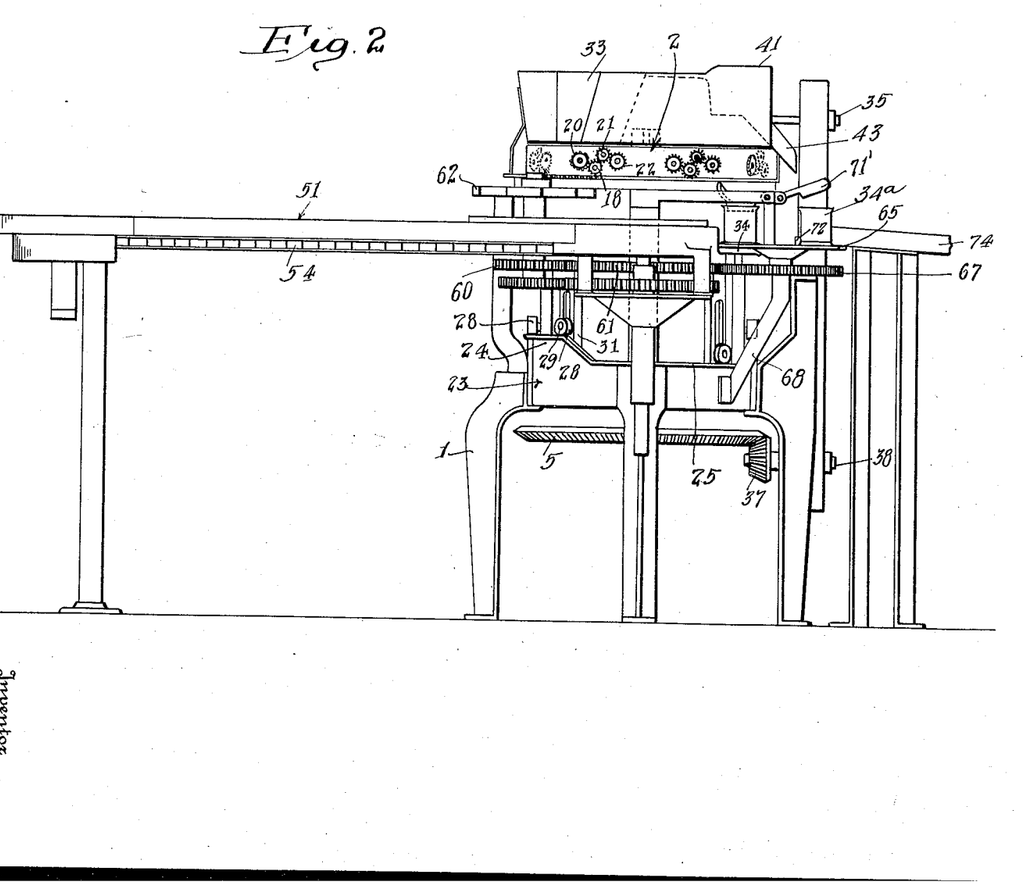
Fig. 2 is a front elevation.

The springs on said pedals or presser members 71 are adapted to maintain the said presser members in raised position as indicated in Fig. 2 at 71'. A shoe 73 is preferably positioned above the normal level of cans being fed to the discharge table 65, said shoe being adapted to contact with the upper surfaces of the pedal or presser members 71 and to force said presser members during rotation of the discharge table 65 and shaft 66 under said shoe 73. In this manner the pedals or presser members 71 are forced down into the filled cans, compressing the fruit or vegetables in said cans to a certain extent. When the presser members 71 are released by the shoe 73 they are raised out of the can by action of the springs mentioned heretofore, thereby permitting the cans to be discharged from the table 65.

As shown in Fig. 1, the cans may be removed from the discharge table 65 by means of guides 74 and a runway 75 leading to a suitable capping or sealing machine. It is to be understood that the shoe 73 may be supported in any suitable manner or as indicated in Fig. 1, by means of arms 76 from a fixed portion of the conveyor 51.

The operation of the device described hereinabove will be clearly understood by those skilled in the art. Empty cans are fed by conveyor 51 to the filling machine, conveyor 51 being driven in timed relation with the rotation of the filling machine, thereby supplying an empty can to each of the can receiving members 26 as it reaches a position opposite the inlet guides 59.

The can receiving members then move upwardly by reason of the rise 24 in the cam 23, thereby pressing the upper edge of the can in contact with the gasket 46. After the can has been raised into this position, the can and can receiving member 26 pass under hopper 33 from which sliced fruits, vegetables and the like are supplied and fed to the can 34ᵃ by means of the rollers 16 and 17, said rollers rotating in pairs in opposed directions so as to force the fruit or vegetables into the can. Simultaneously, the cans are vibrated, shaken or otherwise jolted as by means of the vibrating rack 32, so as to compact the fruit or vegetables in the can. The cans are then passed under the brush 40 where any excess fruit remaining on the top of the can is removed, uninjured fruit or fruit easily removed being thrown by means of the brush 40 into the chute or hopper 41 leading back to hopper 33. The cans are then discharged upon the discharge table 65, being guided upon said table by means of the guides 69. Simultaneously, the can receiving member 26 is dropped. On the discharge table the fruit is compacted within the can and then sent to the capping or sealing machine, which is not shown. It is to be understood that the discharge table is driven in timed relation with the filling machine so as to be able to take care of and handle all cans discharged by the filling machine.

It has been found that the method described hereinabove permits a larger quantity of fruit or vegetables to be packed into cans than by means of any other known prior method. The apparatus disclosed hereinabove is simple in operation and is capable of handling extremely large quantities within a relatively short period of time.

As disclosed hereinabove, provision has been made to prevent the discharge of fruit or vegetables from the hopper 33 onto the can receiving member 26 when a can or container is not in place thereon. Such means includes the gate member 44. These gate members close the openings in the filling head 2, after the cans have been discharged upon the discharge table 65 and after the can receiving member has passed the point at which an empty can is normally placed upon the can receiving member by the conveyor 51. In this manner, when a can receiving member 26 not carrying a can or container passes under a hopper 33, fruit will not be discharged from the hopper through the filling head. This insures cleanliness and a saving in fruit.

It is to be understood that spaces between apertures 9 are suitably closed so as to prevent the discharge of fruit, and that the gaskets or rings 46 are readily detachable so as to accommodate cans of various diameter. Furthermore, the vertical motion of the can receiving members 26 may be readily adjusted by changing the position of the pin 29 in the rod 27.

Although a particular form of this invention has been described in detail, it is to be understood that numerous changes and modifications may be made therein in accordance with particular conditions encountered and with results desired. All such changes and modifications as come within the scope of the appended claims are embraced thereby.

I claim:

1. In an apparatus for filling containers with fruits or vegetables, the combination of a filling table including a stationary base, a filling head rotatably mounted on said base, said head being provided with spaced apertures in its periphery, can receiving members positioned beneath said head and in alinement with said apertures, means for rotating the head and can receiving members in unison, means for vibrating said can receiving members during a portion of their travel, pairs of feed rollers carried by said head beneath each of said apertures, means for rotating said rollers during rotation of said head.

2. In an apparatus for filling containers with fruits or vegetables, the combination of a filling table including a stationary base, a filling head rotatably mounted on said base, said head being provided with spaced apertures in its periphery, can receiving members positioned beneath said head and in alinement with said apertures, means for rotating the head and can receiving members in unison, means for vibrating said can receiving members during a portion of their travel, pairs of feed rollers carried by said head beneath each of said apertures, means for rotating said rollers during rotation of said head, and means for removing excess material from cans at one portion of the travel of said head and can receiving members.

3. In an apparatus for filling containers with fruits or vegetables, the combination of a filling table including a stationary base, a filling head rotatably mounted on said base, said head being provided with spaced apertures in its periphery, can receiving members positioned beneath said head and in alinement with said apertures, means for rotating the head and can receiving members in unison, means for vibrating said can receiving members during a portion of their travel, pairs of feed rollers carried by said head beneath each of said apertures, means for rotating said rollers during rotation of said head, a discharge table rotatably mounted in operative relation with said filling head, means for rotating said discharge table in timed relation with said head, means for discharging cans from said head onto said discharge table, and means carried by said discharge table for pressing the contents of cans during rotation thereof.

4. In an apparatus for filling containers with fruits or vegetables, the combination of a filling table including a stationary base, a filling head rotatably mounted on said base, said head being provided with spaced apertures in its periphery, can receiving members positioned beneath said head and in alinement with said apertures, means for rotating the head and can receiving members in unison, means for vibrating said can receiving members during a portion of their travel, pairs of feed rollers carried by said head beneath each of said apertures, means for rotating said rollers during rotation of said head, means for removing excess material from cans at one portion of the travel of said head and can receiving members, a discharge table rotatably mounted in operative relation with said filling head, means for rotating said discharge table in timed relation with said head, means for discharging cans from said head onto said discharge table, and means carried by said discharge table for pressing the contents of cans during rotation thereof.

5. In an apparatus for filling containers with fruits or vegetables, the combination of a filling table including a stationary base, a filling head rotatably mounted on said base, said head being provided with spaced apertures in its periphery, can receiving members positioned beneath said head and in alinement with said apertures, means for rotating the head and can receiving members in unison, means for vibrating said can receiving members during a portion of their travel, pairs of feed rollers carried by said head beneath each of said apertures, means for rotating said rollers during rotation of said head, and means for removing excess material from cans at one portion of the travel of said head and can receiving members, said means comprising a brush rotatably mounted above said filling head, a discharge table rotatably mounted in operative relation with said head, means for rotating said discharge table in timed relation with said head, and cam actuated means carried by said table for pressing the contents of cans during a portion of their travel.

6. In an apparatus for filling containers with fruit or vegetables, the combination of a filling table including a stationary base, a filling head rotatably mounted on said base, said head being provided with spaced apertures, can receiving members positioned beneath said head and in alinement with said apertures, means for rotating the head and can receiving members in unison, means for vibrating said can receiving members during a portion of their travel, means for raising and lowering said can receiving members at predetermined points in their travel, gate means carried by said head and pivoted on horizontal axes for closing said apertures, and cam means carried by said base for opening said gate means at a predetermined point in their travel.

7. In an apparatus for filling containers with fruits or vegetables, the combination of a filling table including a stationary base, a filling head rotatably mounted on said base, said head being provided with spaced apertures, can receiving members positioned beneath said head and in alinement with said apertures, means for rotating the head and can receiving members in unison, means for vibrating said can receiving means during a portion of their travel, means for raising and lowering said can receiving members at predetermined points in their travel, gate means carried by said head and pivoted on horizontal axes for closing said apertures, means for feeding cans onto said can receiving members, means for driving said can feeding means in timed relation with said head and can receiving means, means for discharging cans from said can receiving members, and cam means carried by said base for opening said gate means during their travel between said discharge table and can feeding means.

8. In an apparatus for filling containers with fruits or vegetables, the combination of a filling table including a stationary base, a filling head rotatably mounted on said table, said head being provided with spaced apertures in its periphery, can receiving members positioned beneath said head and in alinement with said apertures, means for rotating the head and can receiving members in unison, means for raising and lowering said can receiving members at predetermined points in their travel, means for vibrating said can receiving members during a portion of their travel, pairs of feed rollers carried by said head beneath each of said apertures, and means for rotating said rollers during rotation of said head.

9. In an apparatus for filling containers with fruits or vegetables, the combination of a filling table including a stationary base, a filling head rotatably mounted on said base, said head being provided with spaced apertures in its periphery, can receiving members positioned beneath said head and in alinement with said apertures, means for rotating the head and can receiving members in unison, means for raising and lowering said can receiving members at predetermined points in their travel, means for vibrating said can receiving members during a portion of their travel, pairs of feed rollers carried by said head beneath each of said apertures, means for rotating said rollers during rotation of said head, a discharge table rotatably mounted in operative relation with said filling head, means for rotating said discharge table in timed relation with said head, means for discharging cans from said discharge table, and means carried by said discharge table for pressing the contents of cans during movement thereof.

10. In an apparatus for filling containers with fruits or vegetables, the combination of a filling table including a stationary base, a filling head rotatably mounted on said base, said head being provided with spaced apertures in its periphery, can receiving members positioned beneath said head and in alinement with said apertures, means for rotating the head and can receiving members in unison, means for vibrating said can receiving members during a portion of their travel, pairs of feed rollers carried by said head beneath each of said apertures, means for rotating said rollers during rotation of said head, a discharge table rotatably mounted in operative relation with said head, means for rotating said discharge table in timed relation with said head, and cam actuated means carried by said discharge table for pressing the contents of cans during a portion of their travel on said table.

11. In an apparatus for filling containers with fruits or vegetables, the combination of a filling table including a stationary base, a filling head rotatably mounted on said base, said head being provided with spaced apertures in its periphery, can receiving members positioned beneath said head and in alinement with said apertures, means for rotating the head and can receiving members in unison, horizontally pivoted gate means carried by said rotating head for closing said apertures, cam means carried by said base for opening said gate means at a predetermined point in their travel, means for vibrating said can receiving members during a portion of their travel, pairs of feed rollers carried by said head beneath each of said apertures, and means for rotating said rollers during rotation of said head.

12. In an apparatus for filling containers with fruits or vegetables, the combination of a filling table including a stationary base, a filling head rotatably mounted on said base, said head being provided with spaced apertures in its periphery, can receiving members positioned beneath said head and in alinement with said apertures, horizontally pivoted gate means carried by said rotating head beneath each of said apertures for closing said apertures, cam means carried by said base for opening said gate means at a predetermined point in their travel, means for rotating the head and can receiving members in unison, means for vibrating said can receiving members during a portion of their travel, pairs of feed rollers carried by said head beneath each of said apertures, means for rotating said rollers during rotation of said head, a discharge table rotatably mounted in operative relation with said filling head, means for rotating said discharge table in timed relation with said head, means for discharging cans from said head onto said discharge table, and means carried by said discharge table for pressing the contents of cans during movement thereof on said table.

13. In an apparatus for filling containers with fruits or vegetables, the combination of a filling table including a stationary base, a filling head rotatably mounted on said base, said head being provided with spaced apertures in its periphery, pairs of feed rollers carried by said head beneath each of said apertures, means for rotating said rollers during rotation of said head, can receiving members positioned beneath said head and in alinement with said apertures, and means for rotating the head and can receiving members in unison.

14. In an apparatus for filling containers with fruits or vegetables, the combination of a filling table including a stationary base, a filling head rotatably mounted on said base, said head being provided with spaced apertures in its periphery, a feeding hopper positioned above said head, pairs of feed rollers carried by said head beneath each of said apertures, means for rotating said rollers during rotation of said head, the rollers of each pair rotating toward each other, can receiving members positioned beneath said head and in alinement with said apertures, and means for rotating the head and can receiving members in unison.

15. In an apparatus for filling containers with fruits or vegetables, the combination of a filling table including a stationary base, a filling head rotatably mounted on said base, said head being provided with spaced apertures in its periphery, a feeding hopper positioned above said filling table, a plurality of spaced can receiving members mounted on said table and beneath said filling hopper, means for rotating the head and can receiving members in unison, means for raising and lowering said can receiving members at predetermined points in their travel, a horizontally pivoted gate carried by said rotating head beneath each of said apertures, said gate being adapted to close said apertures when a can is not positioned on said can receiving means, and cam means carried by said base for opening said gates at a predetermined point in their travel.

16. In an apparatus for filling containers with fruits or vegetables, the combination of a filling table including a stationary base, a filling head rotatably mounted on said base, said head being provided with spaced apertures in its periphery, a feeding hopper positioned above said filling table, a plurality of spaced can receiving members mounted on said table and beneath said filling head, means for rotating the head and can receiving members in unison, means for feeding cans onto said can receiving members, a discharge table rotatably mounted in operative relation with said head, means for lowering said can receiving members at the portion of their travel between said discharge table and can feeding means, and for raising said can receiving members at other portions of their travel, a horizontally pivoted gate carried by said rotating head beneath each of said apertures, and cam means carried by said base for opening said gates during their travel between said discharge table and can feeding means, said gate means being adapted to be restrained from closing by contact with means on said can receiving means.

17. In an apparatus for filling containers with fruits or vegetables, the combination of a filling table including a stationary base, a filling head rotatably mounted on said base, said head being provided with spaced apertures in its periphery, a feeding hopper positioned above said filling table, a plurality of spaced can receiving members mounted on said table and beneath said filling head, means for rotating the head and can receiving members in unison, means for feeding cans onto said can receiving members, a discharge table rotatably mounted in operative relation with said head, means for lowering said can receiving members at the portion of their travel between said discharge table and can feeding means, and for raising said can receiving members at other portions of their travel, a horizontally pivoted gate carried by said rotating head beneath each of said apertures, cam means carried by said base for opening said gates during their travel between said discharge table and can feeding means, said gate means being adapted to be restrained from closing by contact with means on said can receiving means, and means carried by said discharge table for pressing the contents of cans during movement thereof.

Signed at San Jose, California, this 19th day of September, 1929.

HAL W. NORGAARD.